United States Patent [19]

Harding

[11] Patent Number: 5,104,243
[45] Date of Patent: Apr. 14, 1992

[54] DEVICE FOR ELECTRO-OPTICAL SIGNAL CONVERSION

[75] Inventor: John W. Harding, Waterbeach, United Kingdom

[73] Assignee: E. I. Du Pont de Nemours and Company, Wilmington, Del.

[21] Appl. No.: 694,105

[22] Filed: Apr. 23, 1991

[30] Foreign Application Priority Data

Apr. 23, 1990 [NL] Netherlands .................. 9000967

[51] Int. Cl.$^5$ .................. G02B 6/26; H01R 33/945; H01J 5/16
[52] U.S. Cl. .................. 385/84; 385/89; 385/92; 439/577; 250/227.11
[58] Field of Search .................. 350/96.20, 96.21, 96.22, 350/96.23; 439/577, 76, 493, 249; 250/227.11; 385/84, 88, 89, 92

[56] References Cited

U.S. PATENT DOCUMENTS

| 4,678,264 | 7/1987 | Bowen et al. | 350/96.20 |
| 4,720,630 | 1/1988 | Takeuchi et al. | 250/227 |
| 4,756,593 | 7/1988 | Koakutsu et al. | 350/96.20 |
| 4,762,388 | 6/1988 | Tanaka et al. | 350/96.20 |
| 4,779,948 | 10/1988 | Wais et al. | 350/96.20 |
| 4,863,233 | 9/1989 | Nienaber et al. | 350/96.20 |
| 4,869,566 | 9/1989 | Juso et al. | 350/96.20 |
| 4,944,568 | 7/1990 | Danbach et al. | 439/577 X |
| 4,993,803 | 2/1991 | Suverison et al. | 439/577 X |
| 5,011,425 | 4/1991 | Van Zanten et al. | 439/353 |
| 5,026,291 | 6/1991 | David | 439/493 X |

FOREIGN PATENT DOCUMENTS

| 3524430 | 1/1987 | Fed. Rep. of Germany | 350/96.20 X |
| 2102647 | 4/1972 | France | 350/96.20 X |

Primary Examiner—Brian Healy

[57] ABSTRACT

A device for electro-optical signal conversion having a housing containing electro-optical signal conversion means and electrical and optical contact elements coupled thereto. These electrical and optical contact elements are designed for making contact to electrical and optical connector means, respectively. The housing is provided with latching means for detachably locking the connector means to be coupled thereto. Accordingly, with the device an adapter having an electrical and optical make-and-break connection is provided.

3 Claims, 1 Drawing Sheet

DEVICE FOR ELECTRO-OPTICAL SIGNAL CONVERSION

BACKGROUND OF THE INVENTION

The invention relates to a device for electro-optical signal conversion comprising a housing provided with electro-optical signal conversion means and electrical and optical contact elements coupled thereto.

The transmission of signals by optical means, for example via a glass fibre cable, is increasingly used in practice. In addition to the generally greater transmission capacity of optical links compared with electrical or electromagnetic links, the former are furthermore insensitive to electromagnetic phenomena such as lightning strikes or electromagnetic pulses, it is difficult to "tap off" signals and there is no danger of electromagnetic radiation as a result of the antenna fuction of the cable.

If the signal processing takes place electronically, an electro-optical signal conversion has to be carried out. In practice, two different systems can, in principle, be distinguished for this purpose.

In the one case, such as described by U.S. Pat. No. 4,678,264 and U.S. Pat. No. 4,762,388, one or more electro-optical converters are permanently installed on the printed circuit board which carries the components for the electronic signal processing. In this case, the optical cable may be permanently connected or connected via an optical connector joint to the converters. In the other case, such as described by U.S. Pat. No. 4,756,593, U.S. Pat. No. 4,720,630 and DE-A-3,524,430 an end of the optical cable is permanently connected to one or more electro-optical converters which may be connected in turn, permanently or via an electrical connector joint, to the electronic processing means.

These methods used in practice both have the disadvantage that it is necessary to know in advance, that is to say before the assembly of the electronic signal processing means, whether an optical link is used and where the electro-optical converters are situated, that is to say on the printed circuit board or on the optical cable. In this connection, the risk of damage is greater in the case of electro-optical converters permanently attached to a cable end than in the case of converters installed on the printed circuit board for the electronic signal processing components. During the installation, replacement or repair of the optical cable, damage to the wiring circuit for the electro-optical converters may be caused, inter alia, by insufficiently careful or rough use, by shocks, impacts and the like. In addition, the two systems are not mutually interchangeable, that is to say an optical cable provided with an optical connector cannot be used with a printed circuit board provided with an electrical connector.

SUMMARY OF THE INVENTION

In order to provide a free choice between electrical or optical signal transmission, the invention provides a device, mentioned in the preamble, for electro-optical signal conversion in which the electrical and optical contact elements are designed for making contact to electrical and optical connector means, respectively, and the housing is provided with latching means for detachably locking connector means to be coupled thereto. Latching means for the mutual coupling of connectors are generally known per se in practice.

Compared with the systems known in practice, the device according to the invention is distinguished in that both an electrical and optical make-and-break connection is now provided.

The invention is based on the idea of providing an electro-optical adapter with which, if desired, electronic processing means can mutually interchange signals via an optical link. The electronic processing means can now be assembled even without previous knowledge of the manner of signal transmission as is usual - for making contact thereto via an electrical connector joint. Without using the device according to the invention, signals can be transmitted electrically, while optical signal transmission is possible using the adapter. Conversely, an original optical link can easily be replaced by an electrical link, for example in the case of malfunction or for test purposes.

If a separate adapter is used, the risk of damage due to mechanical effects is furthermore less than in the case of an adapter permanently connected to an optical cable. In the case of damage or malfunction in the adapter according to the invention, it can easily be replaced without further installation operations such as fitting it to an optical cable or on a printed circuit board.

The electrical and/or optical contact elements can be designed as plug and/or socket contact means, situated at one or more sides of the housing. In the preferred embodiment of the device according to the invention, the electrical and optical contact elements are situated at opposite sides of the housing.

Depending on the direction in which the signals have to be exchanged, the electro-optical signal conversion means in the device according to the invention can be designed for only converting electrical signals into optical ones, for only converting optical signals into electrical ones or, if signal transmission via the optical cable is necessary in two directions, for both. If necessary, separate conversion means for only converting electrical signals into optical ones and separate conversion means for only converting optical signals into electrical ones may be accommodated inside one housing, for example, for coupling an optical connector to which a plurality of optical fibres are connected.

The invention is explained below with reference to a preferred embodiment of an adapter according to the invention.

DETAILED DESCRIPTION OF THE EMBODIMENT

Figure 1:
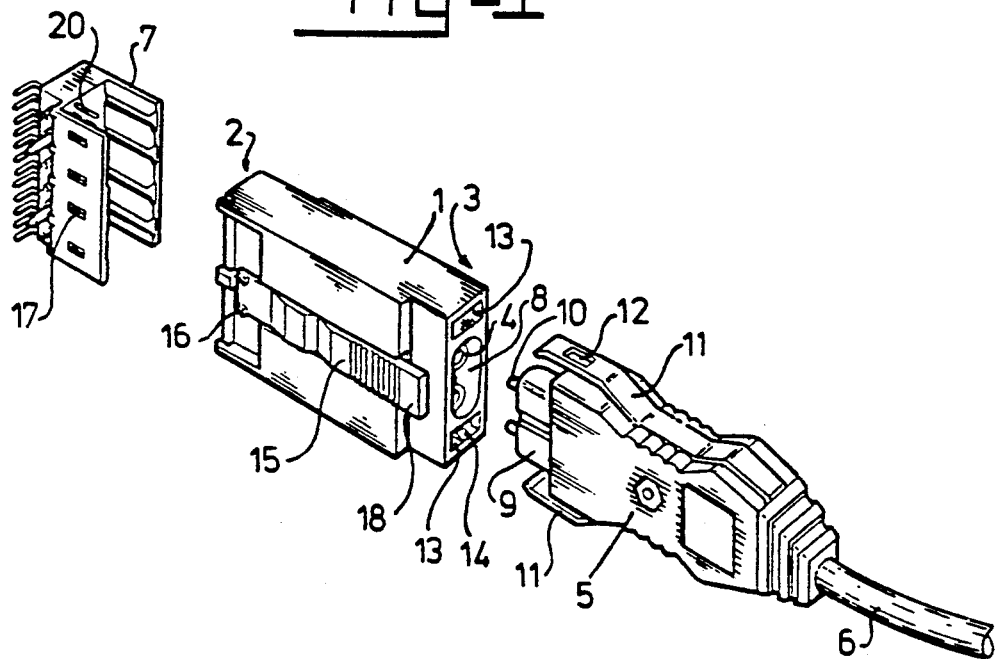
FIG. 1 shows diagrammatically and in perspective an embodiment of the device according to the invention flanked on either side by, respectively, electrical and optical connector means.

The preferred embodiment, shown in FIG. 1, of the device for electro-optical signal conversion according to the invention or termed an adapter for short, comprises a housing 1, for example made of plastic. At one side 2 thereof electrical contact elements (not shown) are situated and at the opposite side 3 there are two optical contact elements 4 for detachably making contact to an optical plug 5 having an optical cable 6 connected thereto, for example an optical cable comprising two glass fibres.

The electrical contact elements at the side 2 are designed to make contact to an electrical connector 7 which may be situated on a printed circuit board on which the components for the electronic signal processing are arranged. Of course, this may also be an electrical connector mounted in a frame or chassis.

At the side 3, the housing 1 is provided with an opening 8, serving as a guide, for receiving a sheath 9 surrounding optical contact elements 10 of the optical plug 5. If necessary, the optical contact elements 4 of the adapter may be provided with lenses (not shown) for focusing and guiding the light rays from the optical plug 5. To latch the optical plug 5 to the housing 1, the former is provided on either side with outwardly spring-loaded latching hooks 11 each having a slot-type opening 12. At the side 3, the housing 1 has receiving openings 13 for receiving the latching hooks 11. Situated in the receiving openings 13 is a boss 14 which, in the assembled state of the adapter and the optical plug 5, engages in the opening 12 of a latching hook 11. The latch can be uncoupled by moving the two latching hooks 11 manually in the direction of the housing of the optical plug 5.

The optical connector plug 5 and receptable housing interface 4, 8, 13, 14 and latching hookes 11 are similar to that disclosed in U.S. Pat. 4,762,388 granted Aug. 9, 1988 to Tanaka et al. and assigned to the same assignee as the present application.

To lock the adapter to the electrical connector 7, the housing 1 is provided at a flat side with a lever-type latching element 15 with bosses 16 which are situated at the end and which, in the assembled state, engage in matchingly situated openings 17 in the housing of the electrical connector 7. The latch can be undone by moving the latching element 15 at the end 18 in the direction of the housing 1. A latching element of this type is described in copending U.S. patent application Ser. No. 07/533,825 filed June 6, 1990 and assigned to the same assignee as the present application.

Figure 2:
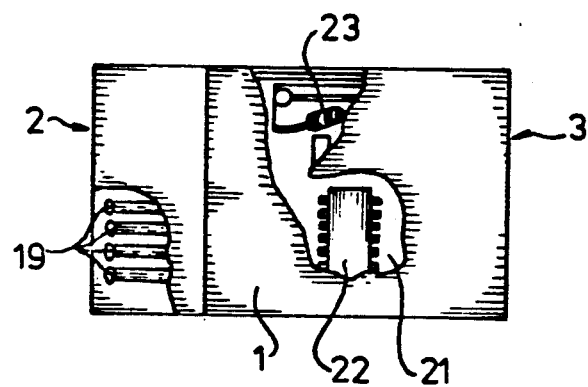
FIG. 2 shows diagrammatically, on an enlarged scale, a partially cut-away plan view of the device according to the invention as shown in FIG. 1.

FIG. 2 shows the adapter according to FIG. 1 on an enlarged scale in which the housing 1 has been partially cut away at the flat side remotely situated from the latching element 15. The electrical contact elements 19 at the side 2 are designed as contact sockets for making contact to the contact pins 20 of the connector 7. Furthermore, the electrical components for the signal conversion mounted on a printed circuit board 21 are partially visible.

The components may comprise one or more photoelectric converters such as a photo cell and the like and/or one or more light emitting elements such as an LED ("light emitting diode"). This is not, however, of importance for the understanding of the present invention. Any type of converter for converting electrical signals into optical ones or optical signals into electrical ones may be used in the adapter. In order to limit the dimensions of the adapter as much as possible, it is preferable to use integrated semiconductor circuit components such as, for example, the integrated circuit IC 22. The power supply to these circuit components is obtained via one or more of the contact elements 19, for example with the insertion of a resistor 23.

It will be clear that the adapter according to the invention may be provided, at a plurality of sides of the housing 1, with electrical and/or optical contact elements for making contact to a plurality of electrical and/or optical connector means.

The optical contact elements 4 can, of course, also be constructed as a plug contact similar to the optical plug 5, while the contact elements 19 can be constructed as contact pins, contact fingers and the like, if necessary arranged in a plurality of mutually offset rows. The latching of the connector means at the housing 1 may also be achieved in any manner known per se in practice.

By the suitable construction of the housing 1 and the suitable arrangement of the electrical and optical contact elements, the adapter according to the invention can be rendered suitable for any type of electrical and optical connector.

I claim:

1. A modular optoelectronic connector assembly for optically interconnecting a fiber optic cable to an electrical circuit substrate comprising:

an optical connector plug for terminating a fiber optic cable having at least one optical fiber, said plug having a housing which includes at one end thereof a protective guide sheath surrounding a termination end of each said optical fiber, a pair of latching spring arms extending along opposite sides of said plug housing towards said one end and having their free ends disposed adjacent opposite sides of said protective sheath, an optoelectronic adapter for converting optically transmitted data to electrically transmitted data and visa versa, said adapter having a housing which includes at one end thereof a plurality of spaces adapted to mate with said one end of the optical connector plug, a first said space serving as a guide for receiving the protective guide sheath of said plug housing, at least one other space within said first spaced adapted for receiving the termination end of each optical fiber of said plug, and a pair of apertures adapted for receiving and releasably latching therein each of the free ends of said pair of latching spring arms of said plug, said adapter housing having at an opposite end a plurality of electrical contacts and optoelectronic conversion means disposed between said electrical contacts and said one end of the adapter housing, said adapter further having a latching lever extending along one side of the adapter housing with a latching end disposed adjacent said opposite end of the adapter housing.

an electrical connector having a housing with a plurality of electrical terminals disposed therein, one end of each terminal matable with a respective one of said electrical contacts of said adapter, the other end of each said terminal mountable on a circuit substrate, and means disposed on said connector housing for releasably engaging the latching end of said latching lever of the adapter, and wherein said optical plug and adapter are joined and releasably latched together at said one end of the adapter housing and said electrical connector and adapter are joined and releasably latched together at said opposite end of the adapter housing.

2. The modular optoelectronic connector assembly of claim 1 wherein the fiber optic cable has two optical fibers, and said protective guide sheath of the optical connector plug housing surrounds two optical fiber terminations and said one end of the adapter housing has two said other spaces for receiving each said termination.

3. The modular optoelectronic connector assembly of claim 1 wherein said electrical contacts of said adapter are socket contacts and said first ends of the electrical terminals of said connector are contact pins.

* * * * *